(12) United States Patent
Reynolds et al.

(10) Patent No.: US 7,237,682 B2
(45) Date of Patent: Jul. 3, 2007

(54) FILTER ASSEMBLY WITH SLIP THREAD

(75) Inventors: Anita L. Reynolds, Temperance, MI (US); Donald J. Gembolis, Toledo, OH (US); Raymond G. Herr, Camden, MI (US); Daniel W. Miller, Luckey, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 421 days.

(21) Appl. No.: 10/874,684

(22) Filed: Jun. 23, 2004

(65) Prior Publication Data

US 2005/0000886 A1    Jan. 6, 2005

Related U.S. Application Data

(60) Provisional application No. 60/484,121, filed on Jul. 1, 2003.

(51) Int. Cl.
 *B01D 35/00* (2006.01)
(52) U.S. Cl. ............... 210/450; 210/444; 210/455; 210/238; 210/451
(58) Field of Classification Search ......... 210/444, 210/454, 450, 455, 497.01, 238, 437, 440, 210/451, 473, 474, 479, 477, DIG. 17; 220/783; 215/334
See application file for complete search history.

(56) References Cited

U.S. PATENT DOCUMENTS 3,698,562 A   10/1972  Farrow et al.
3,767,054 A   10/1973  Farrow et al.
4,617,118 A   10/1986  Smart
5,035,797 A    7/1991  Janik (Continued)

FOREIGN PATENT DOCUMENTS

DE        42 15 232 A1   11/1993

(Continued)

OTHER PUBLICATIONS

The Notification of Transmittal of The International Search Report and the Written Opinion of the International Searching Authority, or the Declaration in corresponding International Application No. PCT/US2004/019330.

(Continued)

*Primary Examiner*—Krishnan S. Menon
*Assistant Examiner*—Benjamin Kurtz
(74) *Attorney, Agent, or Firm*—Christopher H. Hunter (57) ABSTRACT

A filter assembly comprising a housing with a threaded open end, a filter element, and a cover assembly. The filter element includes a media ring and a pair of end caps, one of which includes outwardly-projecting fingers. The cover assembly includes a cover member, and a sleeve with recesses in an outer surface. A collar member surrounds the sleeve and is freely rotationally supported by the cover member. The collar member includes i) a threaded portion on an outer surface for screwing the cover member onto the housing, and ii) recesses in an inner surface. The collar member is rotatable relative to the sleeve such that the recesses in the collar member and in the sleeve can be aligned, and the fingers can be inserted therebetween, to rotationally lock the collar member relative to the sleeve and to retain the element with the cover.

29 Claims, 7 Drawing Sheets

U.S. PATENT DOCUMENTS

| | | | |
|---|---|---|---|
| 5,045,192 | A | 9/1991 | Terhune |
| 5,154,823 | A | 10/1992 | Ma et al. |
| 5,186,829 | A | 2/1993 | Janik |
| 5,538,626 | A * | 7/1996 | Baumann .................... 210/130 |
| 5,593,577 | A | 1/1997 | Imai et al. |
| 5,770,065 | A | 6/1998 | Popoff et al. |
| 6,139,738 | A * | 10/2000 | Maxwell .................... 210/248 |
| 6,146,527 | A | 11/2000 | Oelschlagel |
| 6,171,491 | B1 | 1/2001 | Popoff et al. |
| 6,481,580 | B1 | 11/2002 | Amstutz et al. |

FOREIGN PATENT DOCUMENTS

| | | |
|---|---|---|
| EP | 1 282 426 A1 | 2/2003 |
| WO | WO 98/18539 | 7/1998 |

OTHER PUBLICATIONS

Notification of Transmittal of the International Preliminary Report on Patentability in corresponding International Application No. PCT/US2004/019330.

* cited by examiner

FILTER ASSEMBLY WITH SLIP THREAD

CROSS-REFERENCE TO RELATED CASES

The present application claims the benefit of the filing date of U.S. Provisional Application Ser. No. 60/484,121; filed Jul. 1, 2003, the disclosure of which is expressly incorporated herein by reference.

FIELD OF THE INVENTION

The present invention relates generally to filter assemblies and elements therefore, for removing particulate and other contaminants from a fluid stream.

BACKGROUND OF THE INVENTION

Certain filter assemblies include a filter element located in a housing, where a cover encloses the open end of the housing and provides access to the element for replacement when the element becomes used, worn or spent. The cover has threads on an outer surface thereof which engage cooperating threads on the housing to enable the cover to be easily screwed onto and off of the housing.

One known type of filter element for such a filter housing comprises a sheet of filter material folded to form a plurality of parallel pleats or folds. The side edges of the sheet are brought together so that the sheet has a cylindrical configuration, with the pleats of the sheet extending in the axial or longitudinal direction. The side edges of the sheet are then joined together such as with adhesive, stitching or other means, to retain the filter material in the cylindrical form. The media can be imparted with resin, and/or an outer or inner mesh sheet, weave, mesh or cage can be provided for strength, if necessary or desirable.

Non-pleated media is also known, although pleated media has certain advantages over non-pleated media in some applications, as the pleats provide a large surface area in contact with the fluid to be filtered, which increases the dirt holding capacity and minimizes the pressure loss of the filter element.

The filter media can be coreless, i.e., self-supporting, and received over a cylindrical perforated support tube integral with the filter housing when the element is located in the housing; or can include a cylindrical perforated core integral with the element. End caps are sealingly bonded on either end of the filter element with appropriate adhesive or potting compound being applied between the end caps and the media. One or both of the end caps can have a central opening such that fluid can pass from an inlet, through the media, to an outlet, with particulate and other contaminants being removed by the media. Fluid (air, fuel, oil, hydraulic fluid, etc.) to be filtered typically passes radially inward through the filter media and then outward through the opening in the end cap; however it is also known to have the fluid pass in the opposite manner, that is, through the opening in the end cap, and then radially outward through the media.

One disadvantage with replaceable elements is that when the cover is removed, the element can be saturated with liquid, which can get on the user's hands and clothes as the user attempts to grasp an end cap of the element to remove the element from the housing. Also, it can just be difficult to get one's fingers between the end cap and the housing to grasp the filter element. One solution has been to temporarily connect the element to the cover, such that the user only has to grasp the cover to remove the element from the housing. The element can then be easily removed from the cover when appropriate, and a fresh element attached thereto.

An example of such a solution is shown and described in Popoff, U.S. Pat. No. 6,171,491, which is owned by the assignee of the present invention. In the Popoff design, a pair of lateral projections are provided on an end cap of the filter element, which are received in T-shaped recesses along the inside of the cover. The recesses are formed in an annular sleeve projecting downwardly from the cover, and have both a longitudinally (axially) extending portion and an arcuately (laterally) extending portion. When the cover is screwed off of the housing, the projections enter one of the arcuate portions of the recesses, which thereby retains the element to the cover when the cover is removed. The element can then be easily removed from the cover simply by rotating the element until the projections become aligned with the longitudinal portion, and pulling the element away from the cover (or simply letting the element drop from the cover). An alternative design is also shown in the Popoff patent, where resilient fingers are provided around the end cap, and have tapered, outwardly-extending locking portions which are received in openings spaced around the cover. The fingers retain the element to the cover when the cover is removed from the housing, and the element can be removed from the cover by simply pressing inward on flats of the fingers to disengage the fingers from the cover.

The Popoff designs have received widespread acceptance in the market place as simple techniques for retaining a filter element to a cover when the cover is removed from the housing. Nevertheless, one drawback of such designs is that the cover can be replaced on the housing without an element present. In other words, there is nothing to prevent the user from simply removing the spent element, and then reattaching the cover on the housing without including a fresh element. When the fluid system is thereafter operated, non-filtered fluid can pass through the housing and potentially cause issues with downstream components in the system.

The Popoff designs address this issue by incorporating a valve assembly in a standpipe in the housing, and a projection on the end cap of the element and/or cover to prevent the assembly from being used without an element. The projection must fit within the valve assembly and open a flow path through the filter assembly in order for the filter assembly to be operable. Unfortunately not all filter applications can have such a valve assembly incorporated into the housing. Also, such a valve assembly has a number of parts, which can increase the cost of the assembly.

Alternatively, Oelschlaegel, U.S. Pat. No. 6,146,527, shows a spin-on filter cartridge with a replaceable element which prevents the housing from being attached to a filter head without an element being present. In the Oelschlaegel design, a mounting hub is freely rotatable with respect to a housing, and is rotationally locked with respect thereto, when a series of drive pins on the end cap of the filter element are inserted through openings in the hub and received in corresponding slots in the inside surface of the housing end. While this design prevents the use of the assembly without an element being present, the element is not retained on a cover, and must be directly handled when it is desired to remove the element form the housing.

As such, applicants believe there is a demand in the industry for a filter assembly including a replaceable element and a cover which can temporarily retain the element, whereby the cover and element have cooperating structure to prevent the cover from being attached to the housing without an element present, and which is simple and relatively inexpensive to manufacture.

SUMMARY OF THE PRESENT INVENTION

The present invention thereby provides a novel and unique filter assembly including a replaceable element and a cover which can temporarily retain the element, whereby the cover and element have cooperating structure to prevent the cover from being attached to the housing without an element present, and which is simple and relatively inexpensive to manufacture.

According to the present invention, the filter element includes a series of elongated, flexible fingers, preferably formed unitary with an end cap of the element and projecting axially away from the outer surface. The fingers are received between recesses formed in the cover and in a collar member surrounding the cover to retain the filter element to the cover. The collar member includes an external threaded portion, which can be threaded down onto threads at the open end of the housing when the collar member is locked to the cover. If an element is absent, the collar member is supported for free rotation relative to the cover, which prevents the cover from being attached to the housing.

According to a preferred embodiment, the cover includes a circular body portion, and an annular sleeve integral with and projecting axially away from a surface of the body portion from an inner, attached end to an outer, distal end. The sleeve has a series of distinct recesses in an outer surface thereof, with the recesses spaced around the circumference of the sleeve and dimensioned and located to receive the fingers on the end cap of the filter element. The collar member surrounds the sleeve and is retained by a snap ring to the cover for free rotation relative thereto. The collar member includes i) a threaded portion on an outer surface thereof to allow the cover to be screwed onto and off of the housing, and ii) a series of recesses in an inner surface thereof opening to an outer end of the collar member. The collar member is rotatable into a position relative to the sleeve such that the recesses in the sleeve can be radially aligned with and oppositely positioned relative to the recesses in the collar member such that the fingers of the filter element can be inserted therebetween.

The recesses in the sleeve each open to the distal end of the sleeve and include a radially-outward projecting lip dimensioned to cooperate with a radially-inward directed catch on the distal ends of the fingers. The catches pass over a lip when the element is initially assembled with the cover, and the catches and lips cooperate to retain the fingers in their corresponding recesses. During initial assembly, the fingers force the collar up axially a small amount as the fingers are inserted into the recesses, which facilitates forcing the catches over the lips. The collar then returns to its position around the ends of the fingers when the element is fully assembled with the cover, to fix the element to the cover. Cam surfaces can also be provided along the inner surface of the collar member, with each cam surface extending arcuately a predetermined distance from a side edge of a respective recess. When the collar is rotated relative to the sleeve, the cam surfaces enclose the catches in their respective recesses, and prevent the catches from being removed from their recesses.

The element is initially retained to the cover by rotating the collar member such that the recesses in the collar member are radially aligned with the recesses in the sleeve. The fingers are then inserted between the recesses in the collar member and the sleeve; thereby rotationally locking the collar member with respect to the sleeve. The catches pass over the lip at the mouth of each recess to fix the element on the cover. The filter element and cover subassembly is then inserted into the housing and the cover is screwed onto the open end of the housing such that the filter element is enclosed in the housing.

When the element is spent and is to be replaced, the cover is screwed off of the open end of the housing and the filter element is removed along with the cover. As the cover is unscrewed from the housing, the collar rotates into a position where the collar locks the filter element to the cover, that is, the collar member rotates relative to the sleeve such that the cam surfaces enclose the catches in their respective recesses and prevent the fingers from being removed from the cover. This prevents the element from becoming detached from the cover as the fluid-laden element is removed from the housing. To remove the element from the cover, the collar is rotated slightly with respect to the cover member such that the recesses in the sleeve and collar again become aligned, and the fingers can then be removed from the recesses to separate the filter element from the cover either by pulling out sharply on the element, or raising the collar such that the each catch easily passes over its respective lip.

As such, the present invention provides a novel and unique filter assembly including a replaceable element and a cover which can temporarily retain the element, whereby the cover and element have cooperating structure to prevent the cover from being attached to the housing without an element present, and which is simple and relatively inexpensive to manufacture.

Further features and advantages of the present invention will become apparent to those skilled in the art upon reviewing the following specification and attached drawings.

DETAILED DESCRIPTION OF THE PREFERRED EMBODIMENT

Figure 1:
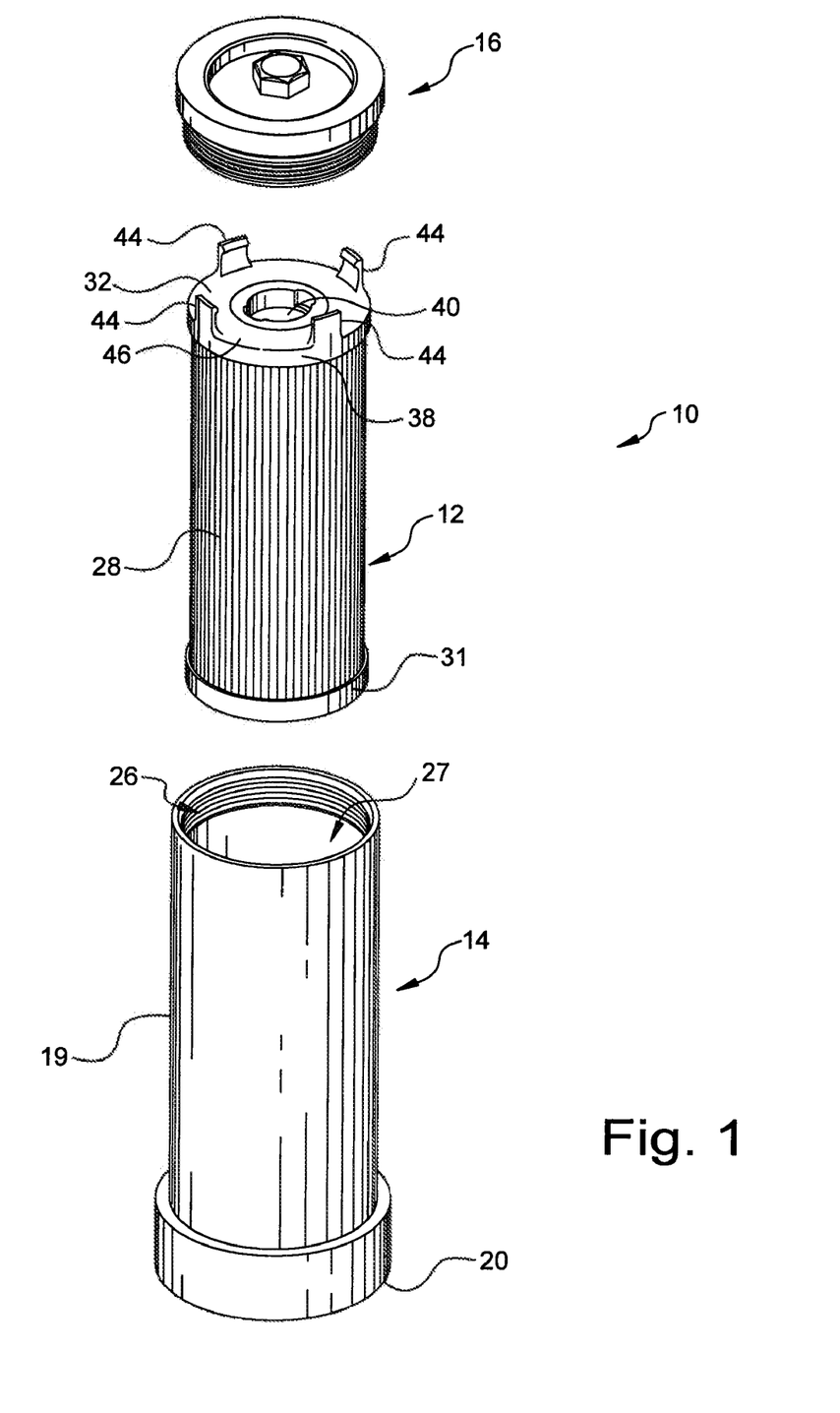
FIG. 1 is an exploded view of a filter assembly constructed according to the principles of the present invention.
Figure 2:
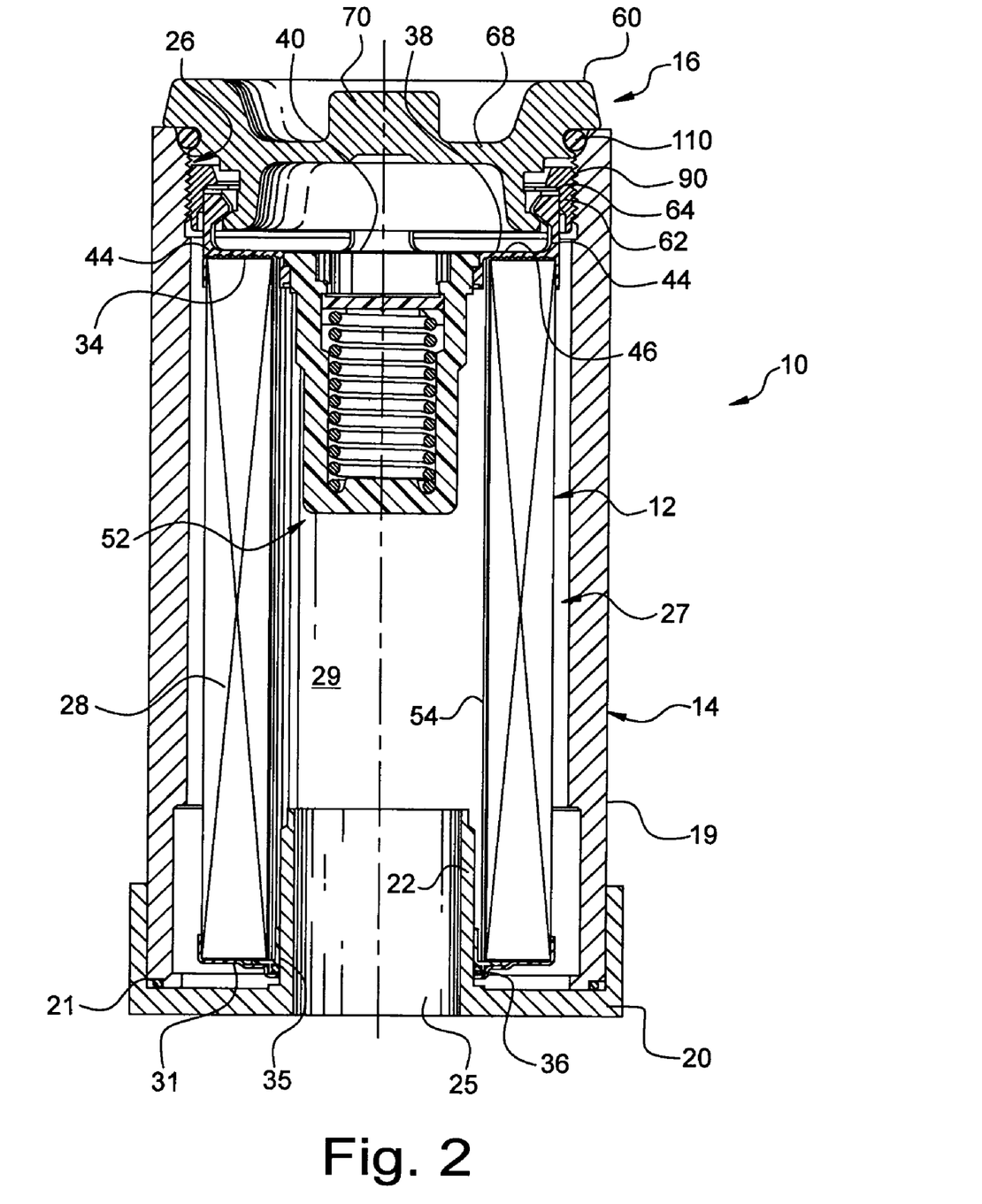
FIG. 2 is a cross-sectional side view of the filter assembly of FIG. 1.

Referring to the drawings, and initially to FIGS. 1 and 2, a filter assembly constructed according to the principles of the present invention is indicated generally at 10. The filter assembly 10 includes a filter element, indicated generally at 12; a housing, indicated generally at 14; and a cover assembly, indicated generally at 16. As should be appreciated upon reviewing the following description, the filter assembly is useful for filtering a variety of fluids, for example hydraulic fluid.

The housing 14 for the filter element generally comprises an elongated canister having a cylindrical body portion 19 and an annular head assembly 20, which is retained to one end of the body portion such as by threads. An O-ring seal or other type of gasket 21 (FIG. 2) is provided between head assembly 20 and body portion 19 to provide a fluid-tight seal. Head assembly 20 includes an inwardly-extending collar 22 bounding central opening 25, and defining a first, outlet flow path internally into the filter element. A second, inlet flow path (not shown) is also provided into the housing, in an area outwardly bounding element 12. A threaded portion, as at 26, is provided at the opposite, open end of the body portion 19, along the inside surface thereof. Housing 14 generally defies an internal cavity, indicated generally at 27.

The filter element 12 has an elongated, cylindrical form, with filter media 28 circumscribing a central cavity 29; and a pair of circular end caps 31, 32 sealingly bonded to opposite ends of the media. End cap 31 (the lower end cap) can be formed of one or more pieces (two are shown) and includes a central circular opening 35, which closely receives collar 22 from housing head assembly 20. A resilient elastomeric O-ring seal or other type of gasket 36 is carried by the end cap 31, and provides a fluid tight seal between the end cap 31 and the collar 22 to allow fluid flow out of central cavity 29.

Figure 3:
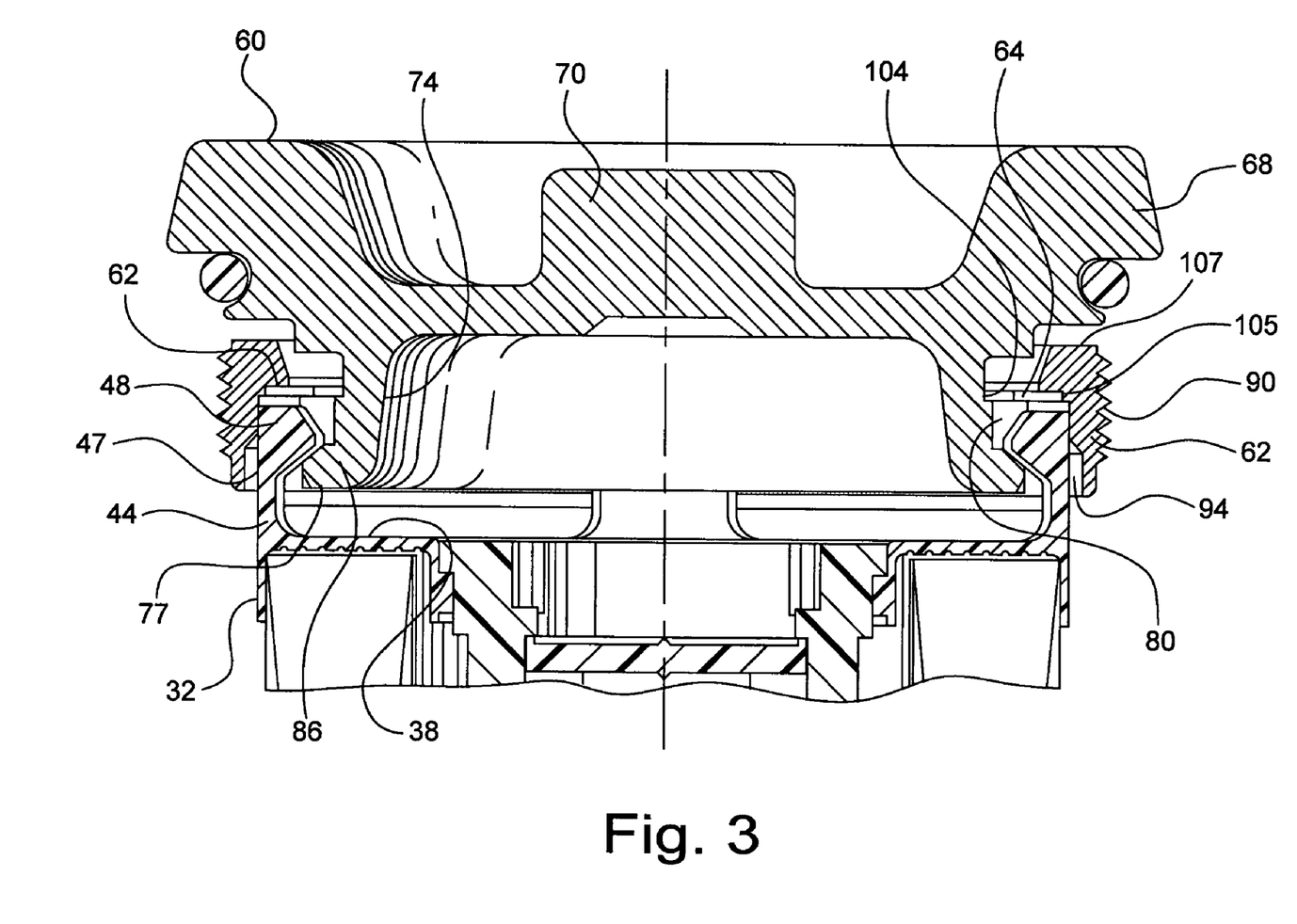
FIG. 3 is an enlarged cross-sectional view of a portion of the filter element for the filter assembly.

End cap 32 (the upper end cap) can also be formed in one or more pieces (one is shown) and includes a flat, annular body portion 38 which bounds a central opening 40 into the central cavity 29 of the filter element. A series of elongated, flexible fingers, as at 44, extend axially outward, away from the upper, outer surface 46 of the end cap 32. The fingers are preferably formed unitary (in one piece) with the body portion 38, and are arranged in a evenly, spaced-apart manner, circumferentially around the outer periphery of the body portion 38. Each finger preferably comprises a short, arcuate section (in cross-section), extending along the outer edge of the end cap. The number, dimension and spacing of the fingers can vary, and it is preferred that there be at least three, and more preferably at least four fingers spaced around the end cap 32; however, again, the number of fingers may vary depending upon the particular application, and the fingers can be spaced at uneven intervals if desired— particularly if it is desired to provide a specific finger arrangement for a specific application (and prevent inadvertent attachment of a filter element designed for another application). As can be seen in FIG. 3, each finger includes an elongated body portion 47; and a catch 48, projecting radially inward and located at the distal end of the finger, the reason for which will be explained in more detail below.

End caps 31, 32 are formed of appropriate impervious material for the particular application, such as plastic, using conventional techniques, such as molding. Appropriate adhesive or potting material is provided between media 28 and the inner surface of end caps 31, 32.

Referring again to FIG. 2, upper end cap 32 supports a relief or bypass valve indicated generally at 52 which allows fluid by-pass of the media in the event the media becomes clogged, so that fluid can still pass through opening 25 to the remainder of the fluid system. The relief valve 52 can be any relief valve appropriate for the particular application, and preferably comprises a relief valve such as shown in U.S. Pat. No. 4,815,493, which is owned by the assignee of the present application and incorporated herein by reference. The relief valve is mounted in the opening 40 of the upper end cap 32 and extends axially inward from end cap 32 into the interior cavity 29 of the filter element.

The filter media 28 is formed of a material having an efficiency and structure (pleated, blown, etc.) appropriate for the particular application. For example, as can be seen in FIG. 1, the filter media 28 can comprise axially-extending pleats which are continuously interconnected with one another and define a filtration ring. The number and dimension of the pleats can vary depending upon the particular application. One appropriate material for filtering hydraulic fluid is Microglass III media, commercially-available from the Hydraulic Filter Division of Parker-Hannifin Corporation, Cleveland, Ohio. This media is a fiberglass and steel composite; however again, this is only one example of material which can be used with the filter media ring 28, and the choice of material will depend upon the particular application. Preferably the media is disposed around a perforated annular core 54, which is formed, for example, from a metal such as steel, and provides internal support for the media.

Figure 4:
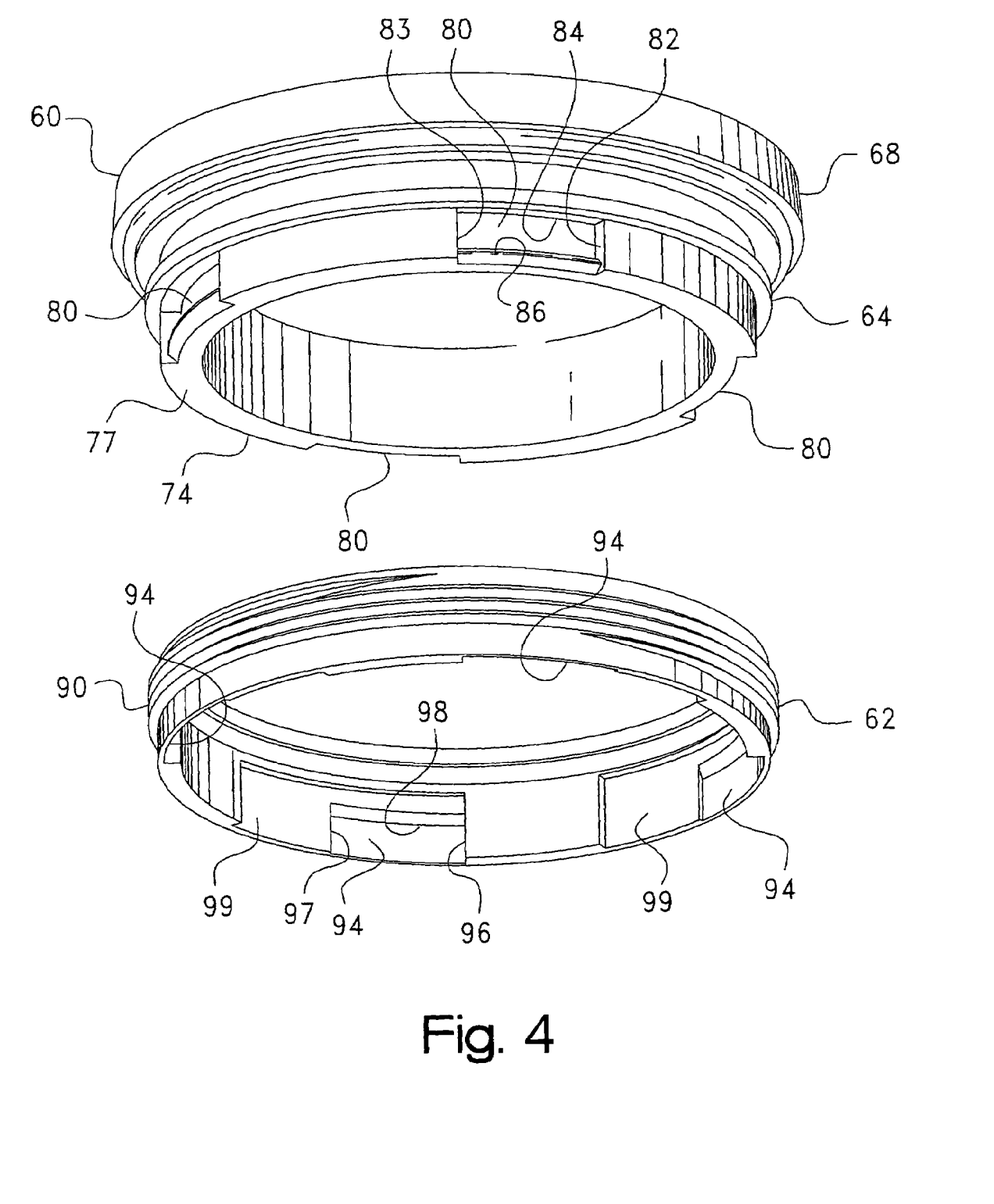
FIG. 4 is an exploded view of the cover assembly for the filter assembly of FIG. 1.

As shown in FIGS. 3 and 4, the cover assembly 16 for the filter assembly comprises a cover member 60; a collar member 62; and a retaining ring 64, which retains the collar member 62 on the cover member 60, and allows relative free rotation therebetween. Cover member 60 includes a circular, somewhat flat body portion 68 preferably having, on its outer surface, a tool engaging geometry, as at 70. The cover member 60 further includes an annular sleeve 74 projecting axially way from an inside surface of the body portion 68. Sleeve 74 is preferably formed unitary with body portion 68, and is spaced radially inward from the outer peripheral edge of the cover member. The sleeve extends inwardly/downwardly from the body portion from an attached end to an inner distal end 77.

A series of distinct recesses or slots, as at 80, are formed in the outer surface of sleeve 74, preferably in an evenly, spaced-apart manner, and opening to the distal end 77 of the sleeve. The recesses are arranged and dimensioned such that they correspond with the location, number and dimension of fingers 44 on the upper end cap 32. The recesses each include a pair of parallel, arcuately spaced-apart and axially-extending side walls as at 82, 83, which terminate in an inner end wall 84, which is spaced axially from the distal end of the sleeve a predetermined amount. A radially outward projecting, relatively thin lip 86 is provided across the opening into each recess, toward the distal end of the sleeve, and extends arcuately from sidewall to sidewall.

The collar member 62 includes a threaded portion as at 90, on an outer surface thereof, which includes threads which match the threads on the inner surface of the housing, to allow the collar member to be screwed onto and off of the housing. A series of distinct recesses as at 94, are provided along the inner surface of the collar member. Recesses 94, similar to recesses 80 in sleeve 74, are spaced evenly around the collar member, and are dimensioned and arranged so that they correspond to the number and dimension of fingers 44 on the upper end cap 32. The recesses 94 also each include a pair of parallel, arcuately spaced-apart and axially-extending sidewalls as at 96, 97, terminating at an inner end wall 98, which is axially spaced from the inner end of the collar member a predetermined amount. The axial length of recesses 94 in collar member 62 is preferably about the same as that of recess 80 in sleeve 74.

A cam surface, indicated generally at 99, is formed in the inner surface of the collar member, adjacent each recess 94. The cam surface extends arcuately in the clockwise direction a predetermined distance from the sidewall around the inner surface of the collar member, and has an inner radial dimension such that a radial gap 100 is defined between the inner surface of the cam surface and the sleeve 74, in the area surrounding the recesses 80. The gap 100 is sufficient (only) to receive the body portion of the finger, as will be described in more detail below.

The retaining ring 64 is preferably a flat, thin ring, such as a snap ring. The retaining ring 64 is received in an annular groove 104 formed in the outer surface of the sleeve 74, between the inner ends of the recesses 80 and the inner attached end of the sleeve at the body portion 68; and in a corresponding annular groove 105 formed in the inner surface of the collar member 62, between the recesses 94 in the collar member and an inner end 107 of the collar member. As should be appreciated, the retaining ring allows the collar member to have free rotation relative to the cover member, and can be easily inserted between the collar member and the sleeve by the use of a conventional tool.

Figure 5:
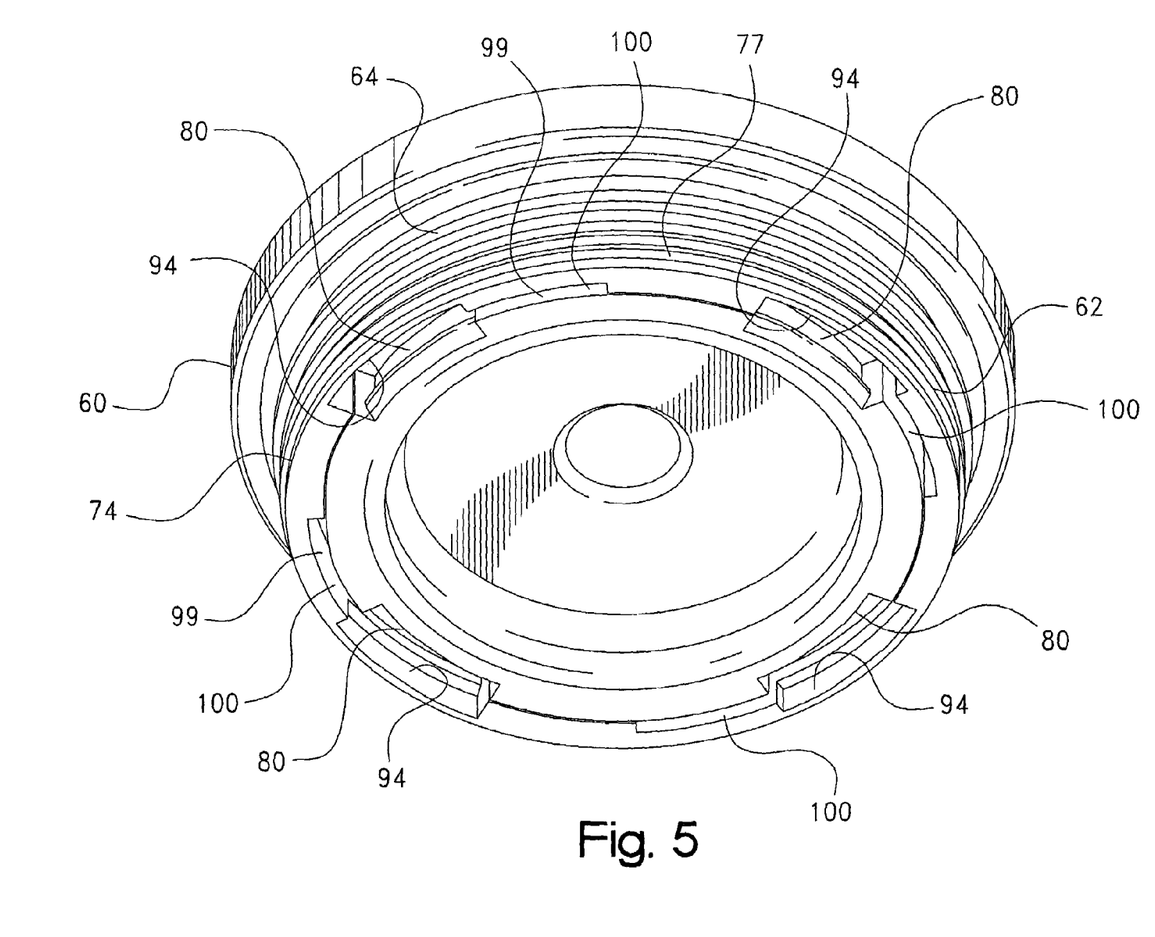
FIG. 5 is an elevated perspective view of the cover assembly.
Figure 6:
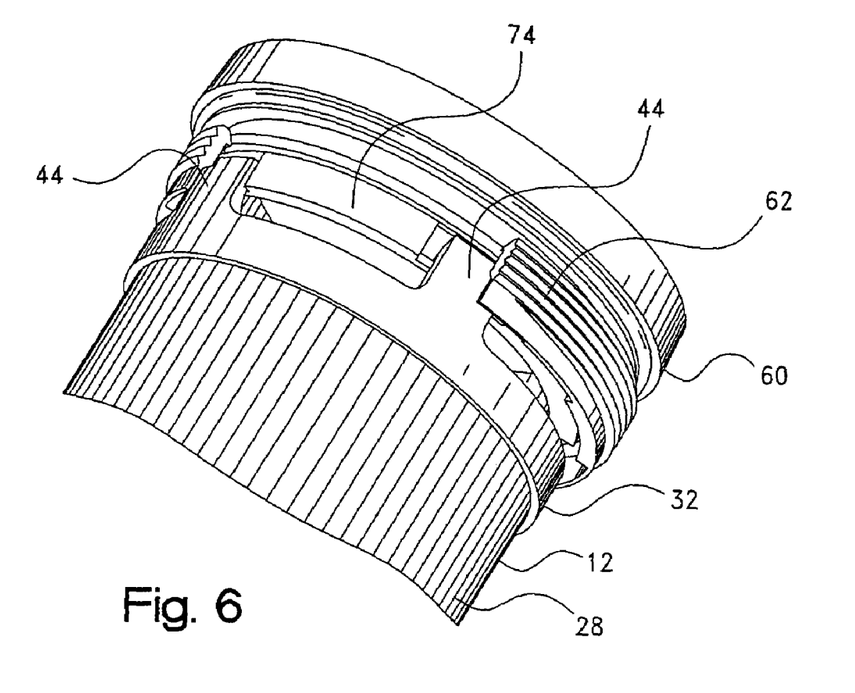
FIG. 6 is an elevated perspective view of the filter assembly, with portions removed for clarity.

Referring now to FIGS. 5 and 6, when it is desirable to attach a filter element 12 to the cover 60, the collar member 62 is rotated such that the recesses 94 in the collar member become radially aligned with and oppositely positioned from the recesses 80 in the sleeve. The fingers 44 of the filter element are then inserted axially between the recesses with the fingers deforming outwardly slightly such that the radially-inward projecting catches 48 on the fingers pass over the radially-outward projecting lips 86 on the recesses of the sleeve (see FIG. 3). Again, the fingers are aligned such that one finger is inserted into each opposing pair of recesses on the sleeve and collar member.

Figure 7:
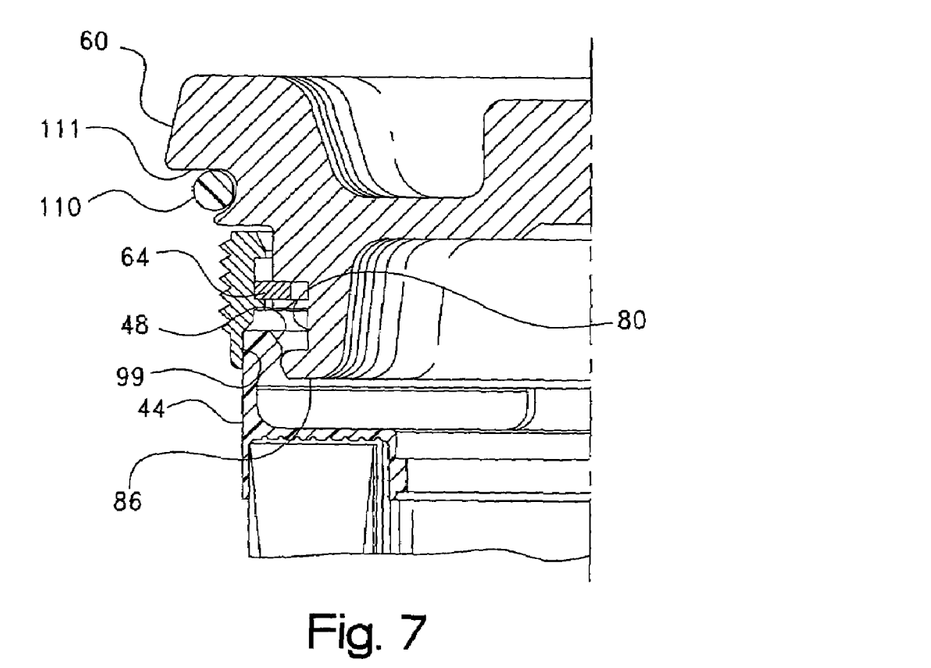
FIG. 7 is a cross-sectional side view of a portion of the filter assembly, showing a first step in the assembly process.
Figure 8:
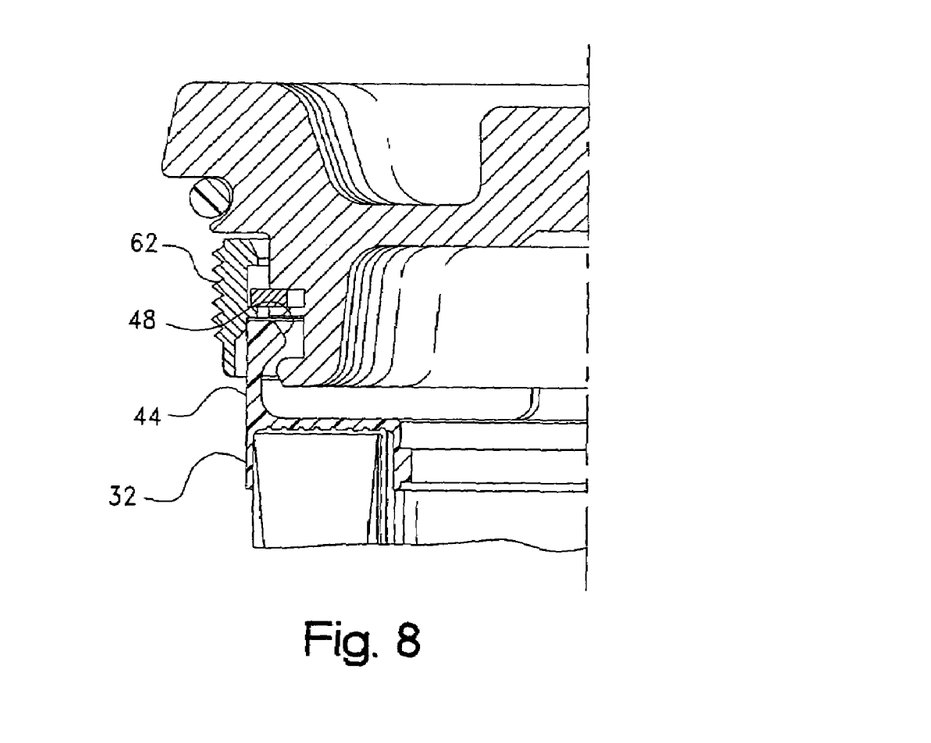
FIG. 8 is a cross-section side view of another portion of the filter assembly, similar to FIG. 7, showing a further step in the assembly process.

When the fingers 44 are inserted between the recesses, the fingers move the collar member 62 axially upward, toward the cover member 60 (as illustrated in FIG. 7), which facilitates forcing the catches 48 over the lips 86. The height of the snap ring groove 104 and collar member groove 105 determines the amount of travel of the collar. When the catches 49 pass over the lips and are received in the recesses 80, the fingers return to their normal position and the collar member 62 can move downwardly over the distal end of the fingers 44 to facilitate retaining the fingers on the cover (as illustrated in FIG. 8). Depending upon the dimensioning of the fingers, recesses and lips/catches, this may be sufficient to prevent the element from being removed from the cover unless the collar member is again moved axially upward to release the catches; or it could merely fix the element to the collar such that it can only be removed by a sharp outward pull.

In any case, when the fingers are inserted as described above, the radially-inward projecting catch 48 on each finger acts as an interference between the sleeve and the collar member, that is, the sidewalls of the sleeve and collar member engage the edges of the sleeve when one is rotated with respect to the other, to rotationally lock the collar member relative to the sleeve. The cover member and filter element subassembly can then be inserted into the housing, and the cover member rotated (clockwise), with the collar member rotating in conjunction therewith, such that the threads on the collar member engage the threads on the housing and the cover member can be screwed down onto the housing to enclose the filter element in the housing (as in FIG. 2).

A resilient elastomeric O-ring 110 can be provided between the open end of the housing and the cover, if necessary or desirable to provide a fluid-tight seal when the cover is fully screwed down onto the housing. O-ring 100 is received in a shoulder 111 (FIG. 7) in cover member 60.

Figure 9:
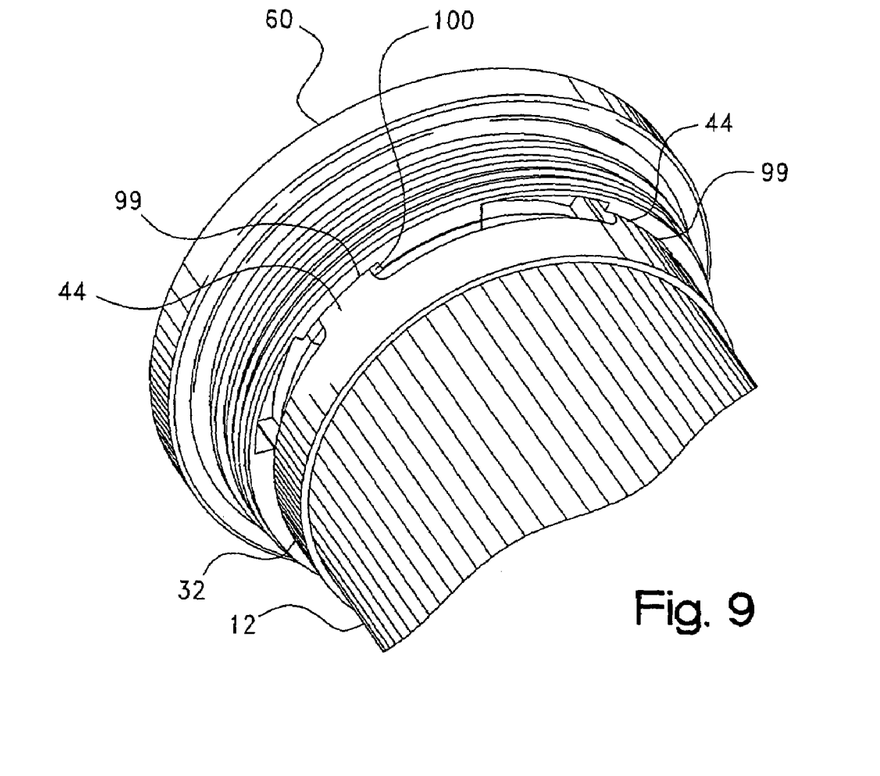
FIG. 9 is an elevated perspective view of a portion of the filter assembly, showing the filter element after removal from the filter housing.

When it is desired to remove a spent or used element from the housing, the cover member is rotated in an opposite (counterclockwise) direction, which unscrews the cover member from the housing. When the collar member 60 is so rotated, friction between the threads of the collar and the threads on the housing causes the cover to rotate relative to the sleeve, and the cam surface 99 on the collar to pass over and become radially aligned with the catches 48 at the distal ends of the fingers, to thereby surround the catches in the recesses 80 in the sleeve as shown in FIG. 9. When the catches are in the respective recesses and held there by cam surface 99, the cover can be removed, and the fingers will be securely retained and locked to the cover member via the catches even if the element is saturated with fluid and somewhat heavy.

When it is desirable to remove the filter element from the cover member, the collar is simply rotated a small amount until the cam surfaces move off of the catches, and the catches move into the recesses in the collar member. The filter element can then be easily axially removed from the cover by pushing the element away from the cover, or in some cases, the element may merely separate from the cover due to its weight. Again, depending upon the dimensioning of the recesses, fingers and catches, it may be necessary to move the collar upward somewhat to release the catches from the recesses, such that the catches can easily pass over the lips, and the element can be separated from the cover.

Again, the cam surfaces may not be necessary in every application, that is, merely the interaction between the catches and lips may be sufficient to fix the element to the cover. Further, it may be possible that merely an interference fit (without the lips and catches) could be provided between the fingers and the recesses to retain the element on the cover. Again, it depends somewhat on the dimensioning of the recesses, fingers and lips/catches (if provided), as well as the desired effort to remove the element from the cover.

As should be appreciated, if it is attempted to attach the cover member to the housing without an element, there will not be any interference between the sleeve and the collar member, and the collar member 62 will rotate freely with respect to the cover member 60. The collar will not engage and screw down onto the threads on the housing, and thus, the cover member cannot be attached to the housing and the fluid system cannot be operated.

As such, the present invention provides a novel and unique filter assembly including a replaceable element and a cover which can temporarily retain the element, whereby the cover and element have cooperating structure to prevent the cover from being attached to the housing without an element present, and which is simple and relatively inexpensive to manufacture.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A cover assembly useable with a filter element having a ring of filtration media circumscribing a central axis and bounded at opposite ends by a pair of end caps, one of the end caps having a series of elongated locking fingers integral with the one end cap and projecting outwardly, axially away from the one end cap, the cover assembly comprising:

a cover member with a circular body portion, and an annular sleeve integral with and projecting axially away from a surface of the body portion from an attached end to an inner, distal end; the annular sleeve having a series of distinct axially-extending recesses in an outer surface thereof opening to an outer end of the sleeve, the recesses circumferentially spaced apart from one another around the circumference of the sleeve and dimensioned and arranged to axially receive the fingers on the one end cap of the filter element; and a collar member, surrounding and rotatably supported relative to the sleeve; and a retaining device axially retaining the collar member on the cover member, but allowing free rotation relative thereto the collar member including i) a threaded portion on an outer surface thereof, and ii) a series of distinct axial recesses in an inner surface thereof opening to an outer end of the collar member, the collar member rotatable into a position relative to the sleeve such that the recesses in the sleeve can be radially aligned with and oppositely positioned relative to the recesses in the collar member to define a series of distinct axial slots opening to an outer end of the cover assembly, and the fingers of the filter element can be axially inserted into the slots.

2. The cover assembly as in claim 1, and a filter element, comprising:

a ring of filtration media circumscribing a central cavity and having opposite ends;

an end cap sealingly bonded to one end of the media ring, the end cap having an outer surface, a series of flexible, elongated locking fingers formed unitary with the end cap and projecting outwardly, axially away from the outer surface of the end cap, the fingers arranged around the peripheral outer edge of the end cap and including radially-inward directed catches at the distal ends of the fingers, each of the fingers being received within a respective slot; and another end cap sealingly bonded to the other end of the media ring.

3. The cover assembly as in claim 2, wherein the fingers comprise short arcuate segments and are evenly-spaced around the circumference of an annular body portion of the end cap.

4. The cover assembly as in claim 1, wherein the collar member is supported by the retaining device for limited axial movement relative to the sleeve, wherein the recesses in the collar member and the recesses in the sleeve, are dimensioned such that the the collar member is moved axially toward the cover member when the fingers are initially inserted into the recesses to enable the fingers to be easily and fully inserted into the recesses, and the collar member moves away from the cover member and into surrounding relation with distal ends of the fingers when the fingers are fully inserted into the recesses to thereby retain the fingers to the collar member and the element on the cover member.

5. The cover assembly as in claim 4, wherein the retaining device comprises a retaining ring received in cooperating and oppositely-facing annular grooves in both the collar member and cover member and axially retaining the collar member on the cover member.

6. The cover assembly as in claim 1, wherein the recesses in the sleeve each open to the distal end of the sleeve and include a lip dimensioned to cooperate with the fingers as the fingers are axially inserted into the grooves to retain the filter element to the cover assembly.

7. The cover assembly as in claim 6, wherein the lip of each recess in the sleeve extends arcuately across an open axial end of each such recess, along the distal end of the sleeve, and the fingers each have a catch dimensioned to cooperate with the lip to retain the element on the cover member.

8. The cover assembly as in claim 7, wherein cam surfaces are provided along the inner surface of the collar member, with each cam surface extending arcuately in a circumferential direction a predetermined distance from a side edge of a respective recess in the collar member, and having a shallower radial depth than a respective recess, the cam surfaces cooperating with the fingers to retain the fingers between the cam surface and a respective recess in the sleeve when the collar member is rotated such that the cam surfaces are radially aligned with the recess in the sleeve.

9. The cover assembly as in claim 8, wherein each cam surface has an inner radial dimension such that a radial gap is provided between the cam surface and an area of the sleeve surrounding the recesses in the sleeve, the gap being sufficient to receive a body portion of the fingers; and the cam surfaces, when the collar member is rotated relative to the sleeve, surrounding the catches on the distal ends of the fingers and maintaining the catches in the recesses in the sleeve.

10. The cover assembly as in claim 1, wherein each recess in the sleeve and in the collar member is defined by a pair of parallel, arcuately-spaced apart and axially-extending side walls.

11. The cover assembly as in claim 1, wherein the cover member further includes tool engaging geometry on an outer side of the body portion.

12. The cover assembly as in claim 1, wherein the annular sleeve is spaced radially inward from the periphery of the body portion of the cover member.

13. A cover assembly useable with a filter element having a ring of filtration media circumscribing a central axis and bounded at opposite ends by a pair of end caps, one of the end caps having a series of elongated locking fingers integral with the one end cap and projecting outwardly, axially away from the one end cap, the cover assembly comprising:

a cover member with a circular body portion, and an annular sleeve integral with and projecting axially away from a surface of the body portion from an attached end to an inner, distal end; the annular sleeve having a series of distinct axially-extending recesses in an outer surface thereof opening to an outer end of the sleeve, the recesses circumferentially spaced apart from one another around the circumference of the sleeve and dimensioned and arranged to axially receive the fingers on the one end cap of the filter element; and a collar member, surrounding the sleeve and fixedly supported by the cover member for free rotation relative thereto, the collar member including i) a threaded portion on an outer surface thereof, and ii) a series of distinct axial recesses in an inner surface thereof opening to an outer end of the collar member, the collar member rotatable into a position relative to the sleeve such that the recesses in the sleeve can be radially aligned with and oppositely positioned relative to the recesses in the collar member to define a series of distinct axial slots opening to an outer end of the cover assembly, and the fingers of the filter element can be axially inserted into the slots, wherein the collar member is supported for axial movement relative to the sleeve, wherein the recesses in the collar member and the recesses in the sleeve are dimensioned such that the collar member is moved axially toward the cover member when the fingers are initially inserted into the recesses to enable the fingers to be easily and fully inserted into the recesses, and the collar member moves away from the cover member and into surrounding relation with distal ends of the fingers when the fingers are fully inserted into the recesses to thereby retain the fingers to the collar member and the element on the cover member, further including a retaining ring retaining the collar member on the cover member, wherein the retaining ring is located between i) an annular groove on the outer surface of the sleeve, between the recesses in the sleeve and the cover member, and ii) a corresponding annular groove on the inner surface of the collar member, between the recesses in the collar member and an inner end of the collar member.

14. The cover assembly as in claim 13, wherein the retaining ring is a snap ring.

15. A filter assembly comprising a housing having a closed end and an open end and defining an interior cavity, a filter element disposed in the cavity of the housing, and a cover assembly removeably connected to the open end of the housing to enclose the filter element therein,
  a. the housing including a threaded portion at its open end;
  b. the filter element including a ring of filtration media circumscribing a central axis and bounded at opposite ends by a pair of end caps, one of the end caps having a series of distinct elongated locking fingers integral with the one end cap and projecting outwardly, axially away from the one end cap; and
  c. the cover assembly including a cover member with a circular body portion, and an annular sleeve integral with and projecting axially away from a surface of the body portion from an attached end to an inner, distal end; the annular sleeve having a series of distinct axially-extending recesses in an outer surface thereof opening to an outer end of the sleeve, the recesses circumferentially spaced apart from one another around the circumference of the sleeve; and a collar member, surrounding the sleeve and supported by the cover member normally for free rotation relative thereto, the collar member including i) a threaded portion on an outer surface thereof in threaded engagement with the threaded portion of the housing, and ii) a series of distinct axial recesses in an inner surface thereof opening to an outer end of the collar member, the collar member rotated into a position relative to the sleeve such that the recesses in the sleeve are radially aligned with and oppositely positioned relative to the recesses in the collar member to define a series of distinct axial slots opening to an outer end of the cover assembly, and the fingers of the filter element are inserted axially into the slots, such that the fingers provide an interference between the collar member and the sleeve and rotationally lock the collar member relative to the sleeve such that the cover member can be screwed onto and off of the housing with the rotation of the cover member being translated to the rotation of the collar member.

16. The filter assembly as in claim 15, wherein the fingers of the one end cap of the filter element are flexible, and each includes a radially-inward directed catch at the distal end of the finger, the catches cooperating with the recesses in the sleeve to retain the filter element to the cover member.

17. The filter assembly as in claim 16, wherein the recesses in the sleeve each open to the distal end of the sleeve, and include a radially-outward projecting lip, and the fingers resiliently deflect when the fingers are inserted into the recesses, with the catches passing over and cooperating with the lip to retain the filter element on the cover member.

18. The filter assembly as in claim 17, wherein cam surfaces are provided along the inner surface of the collar member, with each cam surface extending arcuately a predetermined distance from a side edge of a respective recess in the collar member and having a shallower relative radial depth, the collar member rotating with respect to the cover member when the cover member is screwed off of the housing such that the cam surfaces surround the catches in the recesses in the sleeve to retain the filter element on the cover member such that the filter element is removed with the cover when the cover is removed from the housing.

19. The filter assembly as in claim 18, wherein the cam surfaces have an inner radial dimension such that a radial gap is provided between the cam surface and area of the sleeve surrounding the recesses in the sleeve, the gap being sufficient to receive a body portion of the fingers.

20. The filter assembly as in claim 15, wherein the fingers are arranged around the periphery of the one end cap in an even, circumferentially-spaced apart manner.

21. The filter assembly as in claim 15, wherein the collar member is supported on the cover member for relative limited axial movement, wherein the collar member is supported for axial movement relative to the sleeve, wherein the recesses in the collar member, the recesses in the sleeve, and the fingers are dimensioned such that the fingers move the collar member axially toward the cover member when the fingers are initially inserted into the recesses to enable the fingers to be easily and fully inserted into the recesses, and when the fingers are fully inserted into the recesses, the collar member moves away from the cover member in surrounding relation with the distal ends of the fingers to thereby retain the fingers to the collar member and the element on the cover member.

22. The filter assembly as in claim 15, wherein each recess in the sleeve and in the collar member is defined by a pair of parallel, arcuately-spaced apart and axially-extending side walls.

23. The filter assembly as in claim 15, wherein the cover member further includes tool engaging geometry on an outer side of the body portion.

24. The filter assembly as in claim 15, wherein the annular sleeve is spaced radially inward from a periphery of the cover member.

25. The filter assembly as in claim 15, wherein a retaining device axially retains the collar member on the cover member, but allows free rotation relative therewith.

26. A filter assembly comprising a housing having a closed end and an open end and defining an interior cavity, a filter element disposed in the cavity of the housing, and a cover assembly removeably connected to the open end of the housing to enclose the filter element therein,
  a. the housing including a threaded portion at its open end;
  b. the filter element including a ring of filtration media circumscribing a central axis and bounded at opposite ends by a pair of end caps, one of the end caps having a series of elongated locking fingers integral with the one end cap and projecting outwardly, axially away from the one end cap; and
  c. the cover assembly including a cover member with a circular body portion, and an annular sleeve integral with and projecting axially away from a surface of the body portion from an attached end to an inner, distal end; the annular sleeve having a series of distinct recesses in an outer surface thereof, the recesses spaced around the circumference of the sleeve; and a collar member, surrounding the sleeve and supported by the cover member normally for free rotation relative thereto, the collar member including i) a threaded portion on an outer surface thereof in threaded engagement with the threaded portion of the housing, and ii) a series of distinct recesses in an inner surface thereof opening to an outer end of the collar member, the collar member rotated into a position relative to the sleeve such that the recesses in the sleeve are radially aligned with and oppositely positioned relative to the recesses in the collar member, and the fingers of the filter element are inserted therebetween, such that the fingers provide an interference between the collar member and the sleeve and rotationally lock the collar member relative to the sleeve such that the cover member can be screwed onto and off of the housing with the rotation of the cover member being translated to the rotation of the collar member; wherein the collar member is supported on the cover for relative axial movement, wherein the collar member is supported for axial movement relative to the sleeve, wherein the recesses in the collar member, the recesses in the sleeve, and the fingers are dimensioned such that the fingers move the collar member axially toward the cover member when the fingers are initially inserted into the recesses to enable the fingers to be easily and fully inserted into the recesses, and when the fingers are fully inserted into the recesses, the collar member moves away from the cover member in surrounding relation with the distal ends of the fingers to thereby retain the fingers to the collar member and the element on the cover member, and further including a retaining ring retaining the collar member on the cover member, the retaining ring being located between i) an annular groove on the outer surface of the sleeve, between the recesses in the sleeve and the cover member, and ii) a corresponding annular groove on the inner surface of the collar member, between the recesses in the collar member and an inner end of the collar member.

27. A method for attaching and removing a replaceable filter element to and from a cover member of a filter assembly, where the filter assembly includes a housing having a closed end and an open end and defining an interior cavity, the filter element can be disposed in the cavity of the housing, and the cover member can be removeably connected to the open end of the housing to enclose the filter element therein, the housing including a threaded portion at its open end; the filter element including a ring of filtration media circumscribing a central axis and bounded at opposite ends by a pair of end caps, one of the end caps having a series of distinct, elongated locking fingers integral with the one end cap and projecting outwardly, axially away from the one end cap, with each finger having a radially-inward directed catch at its distal end; and the cover member including a circular body portion, and an annular sleeve integral with and projecting axially away from a surface of the body portion from an inner, attached end to an outer, distal end; the annular sleeve having a series of distinct axial recesses in an outer surface thereof, the recesses spaced apart from one another around the circumference of the sleeve and dimensioned and located to axially receive the fingers on the one end cap of the filter element; and a collar member, surrounding the sleeve and axially supported by the cover member normally for free rotation relative thereto, the collar member including i) a threaded portion on an outer surface thereof in threaded engagement with the threaded portion of the housing, and ii) a series of distinct axial recesses in an inner surface thereof opening to an outer end of the collar member, the method comprising:

a. rotating the collar member such that the recesses in the collar member are radially aligned with and oppositely positioned from the recesses in the sleeve and define axial slots opening to an outer end of the collar and sleeve;

b. axially inserting the fingers into the slots between the recesses in the collar member and the sleeve; thereby rotationally locking the collar member with respect to the sleeve and creating a subassembly; and thereafter c. inserting the filter element subassembly into the housing and screwing the cover member onto the open end of the housing such that the filter element is enclosed in the housing.

28. A method for attaching and removing a replaceable filter element to and from a cover member of a filter assembly, where the filter assembly includes a housing having a closed end and an open end and defining an interior cavity, the filter element can be disposed in the cavity of the housing, and the cover member can be removeably connected to the open end of the housing to enclose the filter element therein, the housing including a threaded portion at its open end; the filter element including a ring of filtration media circumscribing a central axis and bounded at opposite ends by a pair of end caps, one of the end caps having a series of elongated locking fingers integral with the one end cap and projecting outwardly, axially away from the one end cap, with each finger having a radially-inward directed catch at its distal end; and the cover member including a circular body portion, and an annular sleeve integral with and projecting axially away from a surface of the body portion from an inner, attached end to an outer, distal end; the annular sleeve having a series of distinct recesses in an outer surface thereof, the recesses spaced around the circumference of the sleeve and dimensioned and located to receive the fingers on the one end cap of the filter element; and a collar member, surrounding the sleeve and supported by the cover member normally for free rotation relative thereto, the collar member including i) a threaded portion on an outer surface thereof in threaded engagement with the threaded portion of the housing, and ii) a series of distinct axial recesses in an inner surface thereof opening to an outer end of the collar member, the method comprising:

a. rotating the collar member such that the recesses in the collar member are radially aligned with and oppositely positioned from the recesses in the sleeve;

b. axially inserting the fingers between the recesses in the collar member and the sleeve; thereby rotationally locking the collar member with respect to the sleeve and creating a subassembly; and thereafter c. inserting the filter element subassembly into the housing and screwing the cover member onto the open end of the housing such that the filter element is enclosed in the housing, wherein the collar member includes a cam surface on its inside surface, and when the element is spent and is to be replaced, the method further including screwing the cover member off of the open end of the housing and removing the filter element from the housing, the collar member rotating with respect to the sleeve such that the cam surfaces are radially oppositely positioned from the catches and maintain the catches on the fingers in the recesses in the sleeve, such that the element is retained with the cover member when the cover member and element are removed from the housing, and thereafter rotating the collar member with respect to the cover member such that the cam surfaces are moved away of the fingers, and the recesses in the sleeve again become aligned with the recesses in the collar member whereby the fingers can be axially removed from the cover member to separate the filter element from the cover member.

29. A method for attaching and removing a replaceable filter element to and from a cover member of a filter assembly, where the filter assembly includes a housing having a closed end and an open end and defining an interior cavity, the filter element can be disposed in the cavity of the housing, and the cover member can be removeably connected to the open end of the housing to enclose the filter element therein, the housing including a threaded portion at its open end; the filter element including a ring of filtration media circumscribing a central axis and bounded at opposite ends by a pair of end caps, one of the end caps having a series of elongated locking fingers integral with the one end cap and projecting outwardly, axially away from the one end cap, with each finger having a radially-inward directed catch at its distal end; and the cover member including a circular body portion, and an annular sleeve integral with and projecting axially away from a surface of the body portion from an inner, attached end to an outer, distal end; the annular sleeve having a series of distinct recesses in an outer surface thereof, the recesses spaced around the circumference of the sleeve and dimensioned and located to receive the fingers on the one end cap of the filter element; and a collar member, surrounding the sleeve and supported by the cover member normally for free rotation relative thereto, the collar member including i) a threaded portion on an outer surface thereof in threaded engagement with the threaded portion of the housing, and ii) a series of distinct axial recesses in an inner surface thereof opening to an outer end of the collar member, the method comprising:

a. rotating the collar member such that the recesses in the collar member are radially aligned with and oppositely positioned from the recesses in the sleeve;

b. axially inserting the fingers between the recesses in the collar member and the sleeve; thereby rotationally locking the collar member with respect to the sleeve and creating a subassembly; and thereafter inserting the filter element subassembly into the housing and screwing the cover member onto the open end of the housing such that the filter element is enclosed in the housing, wherein the collar member is supported for axial movement relative to the cover member, and the recesses in the sleeve each have a lip projecting radially outward at a distal end of the sleeve; and the fingers, when inserted into the recesses, pushing the collar member upwardly away from the distal end of the sleeve, thereby enabling the catches on the fingers to pass easily over the lips and into the recesses, the collar member then moving down around the distal ends of the fingers to retain the catches in the recesses and thereby lock the fingers to the cover member.

* * * * *